United States Patent
Sugiura et al.

(10) Patent No.: US 12,091,560 B2
(45) Date of Patent: Sep. 17, 2024

(54) INK, PRINTED ARTICLE, AND METHOD OF MANUFACTURING PRINTED ARTICLE

(71) Applicant: DIC Corporation, Tokyo (JP)

(72) Inventors: Kenichi Sugiura, Kita-adachi-gun (JP); Tomohito Hata, Kita-adachi-gun (JP); Satoshi Hashimoto, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 421 days.

(21) Appl. No.: 16/611,076

(22) PCT Filed: May 17, 2018

(86) PCT No.: PCT/JP2018/019054
§ 371 (c)(1),
(2) Date: Nov. 5, 2019

(87) PCT Pub. No.: WO2018/221235
PCT Pub. Date: Dec. 6, 2018

(65) Prior Publication Data
US 2020/0148900 A1 May 14, 2020

(30) Foreign Application Priority Data

May 30, 2017 (JP) ................... 2017-106547
Jun. 20, 2017 (JP) ................... 2017-120463

(51) Int. Cl.
| C09D 11/107 | (2014.01) |
| B41M 5/00 | (2006.01) |
| B41M 5/50 | (2006.01) |
| C09D 11/023 | (2014.01) |
| C09D 11/30 | (2014.01) |

(52) U.S. Cl.
CPC ......... C09D 11/107 (2013.01); B41M 5/0023 (2013.01); B41M 5/50 (2013.01); C09D 11/023 (2013.01); C09D 11/30 (2013.01)

(58) Field of Classification Search
CPC ..... C09D 11/107; C09D 11/023; C09D 11/30; C09D 11/322; B41M 5/0023; B41M 5/50; B41M 5/00; D06P 1/525; B41J 2/01
See application file for complete search history.

(56) References Cited

U.S. PATENT DOCUMENTS

| 4,598,118 A | * | 7/1986 | Hansen | ................ C08F 222/04 |
| | | | | 526/272 |
| 5,731,368 A | | 3/1998 | Stanley et al. | |
| 6,194,510 B1 | * | 2/2001 | Anderson | ................. C08J 3/03 |
| | | | | 524/502 |
| 6,232,369 B1 | * | 5/2001 | Ma | ........................ C09D 11/30 |
| | | | | 524/505 |
| 8,329,814 B2 | * | 12/2012 | Ma | ....................... C09D 11/322 |
| | | | | 524/517 |
| 2014/0186541 A1 | * | 7/2014 | Clark | ..................... C09J 133/14 |
| | | | | 427/516 |
| 2018/0282943 A1 | * | 10/2018 | Yamakawa | ........ C08G 18/0823 |

FOREIGN PATENT DOCUMENTS

| JP | 9-118728 A | 5/1997 |
| JP | 2008-24830 A | 2/2008 |
| JP | 2010-229249 A | 10/2010 |
| JP | 2016-199643 A | 12/2016 |
| WO | 2016/190208 A1 | 12/2016 |

OTHER PUBLICATIONS

International Search Report dated Jul. 3, 2018, issued in counterpart International Application No. PCT/JP2018/019054 (2 pages).
Notice of Reasons for Refusal dated Dec. 13, 2018, issued in counterpart JP Patent Application No. 2018-554428, w/English translation (6 pages).
Decision to Grant a Patent dated dated Apr. 16, 2019, issued in counterpart JP Patent Application No. 2018-554428, w/English translation (5 pages).

* cited by examiner

*Primary Examiner* — Jessica M Roswell
(74) *Attorney, Agent, or Firm* — WHDA, LLP

(57) ABSTRACT

A task to be achieved by the present invention is to provide an ink which can form a printed image or the like having color fastness to water at a level where the image will not be removed from the recording medium even when, for example, washed with water, warm water, or the like. Further, another task to be achieved by the invention is to provide an ink which can form a printed image or the like which is unlikely to suffer from color fading even when, for example, washed by an ultrasonic cleaning method or the like that is used for cleaning a stain strongly deposited on clothes or the like. The present invention is directed to an ink containing a polymer (A) having a predetermined structure (a1).

14 Claims, 1 Drawing Sheet

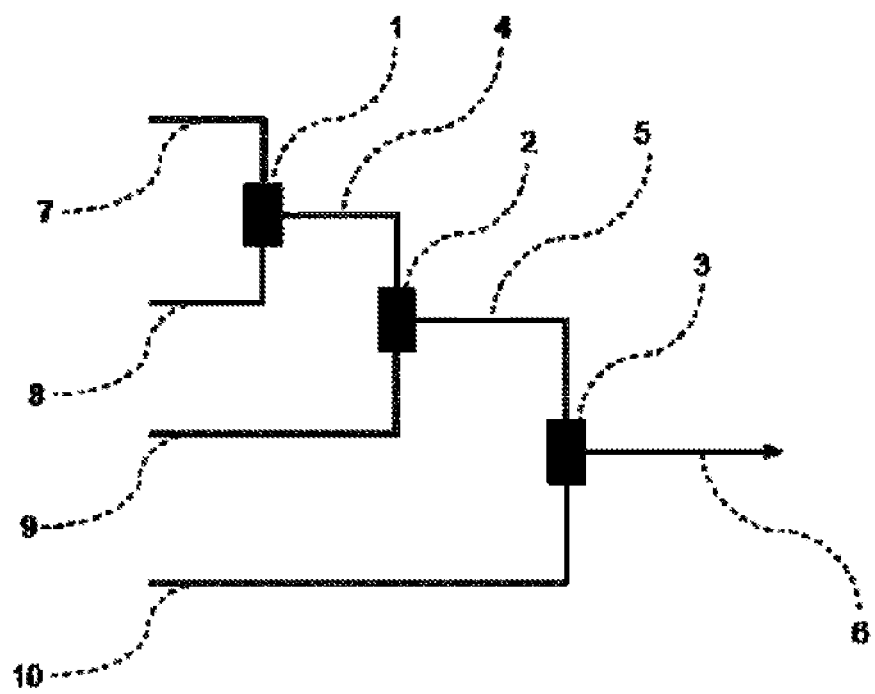

INK, PRINTED ARTICLE, AND METHOD OF MANUFACTURING PRINTED ARTICLE

TECHNICAL FIELD

The present invention relates to an ink which can be used in printing on various recording media, such as clothes.

BACKGROUND ART

It has been known that an ink containing, for example, a pigment can be used when printing images of letters, pictures, patterns, or the like on recording media including cloths, such as woven fabric, nonwoven fabric, and knitted fabric.

With respect to the above-mentioned ink, generally, there has been known an ink which is obtained by mixing a binder resin and other additives into an aqueous pigment dispersion containing a pigment at a high concentration, which is diluted with water if necessary. For example, a printing ink having a polyurethane resin as a binder resin for use in printing on a cloth has been known (see, for example, PTL 1).

Meanwhile, as a printing method for the ink on a recording medium, for example, a method using an ink-jet recording apparatus has been known. The printing method using an ink-jet recording apparatus has advantages in that the formation of a printing plate for each picture or pattern to be printed is not needed, and that it is possible to reduce the cost and the time to delivery in small-size lot printing, and thus the use of the method in the production of fiber products, such as clothes and a curtain, is studied.

However, when the fiber product printed using a conventional ink is washed with water, warm water, or the like, it is likely that removal of the printed image or the like from the fiber is caused, leading to extremely low design quality of the fiber product.

CITATION LIST

Patent Literature

PTL 1: JP-A-2016-199643

SUMMARY OF INVENTION

Technical Problem

A task to be achieved by the present invention is to provide an ink which can form a printed image or the like having color fastness to water at a level where the image will not be removed from a recording medium, such as a cloth, even when, for example, washed with water, warm water, or the like.

Further, another task to be achieved by the invention is to provide an ink which can form a printed image or the like which is unlikely to suffer from color fading even when, for example, washed by an ultrasonic cleaning method or the like that is used for cleaning a stain strongly deposited on clothes or the like.

Solution to Problem

The present invention is directed to an ink including a polymer (A) having a structure (a1) represented by the following general formula (1):

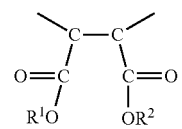

wherein $R^1$ and $R^2$ each independently represent a hydrogen atom or a cation.

Advantageous Effects of Invention

By using the ink of the invention, there can be obtained a printed article having a printed image or the like having fastness to water at a level where the image will not be removed from a recording medium, such as a cloth even when, for example, washed with water, warm water, or the like. The printed article has excellent color fastness to washing.

Further, by using the ink of the invention, especially a specific ink, there can be obtained a printed article having a printed image or the like having fastness to washing at a level where the image does not suffer from color fading, for example, even when washed by an ultrasonic cleaning method or the like that is used for cleaning a stain strongly deposited.

BRIEF DESCRIPTION OF DRAWING

FIG. 1 is a diagrammatic view of the microreactor used in the invention.

DESCRIPTION OF EMBODIMENTS

The ink of the invention includes a polymer (A) having a structure (a1) represented by the following general formula (1)

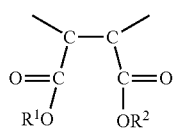

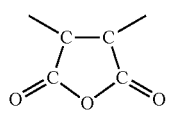

wherein $R^1$ and $R^2$ each independently represent a hydrogen atom or a cation.

With respect to the ink of the invention, for example, the ink having the polymer (A) dissolved or dispersed in an aqueous medium or an organic solvent can be used, and the ink having the polymer (A) dissolved or dispersed in an aqueous medium (C), such as water, is preferably used.

With respect to the polymer (A), from the viewpoint of obtaining the ink having the polymer (A) stably dissolved or dispersed in an aqueous medium (C), such as water, it is preferred to use the polymer (A) having a structure represented by the general formula (1) above, which is formed by ring opening of a structure represented by the chemical formula (3) above or neutralization of part of or all of the resultant carboxyl group. The structure (a1) represented by the general formula (1) above forms the structure represented by the chemical formula (3), which is a carboxylic anhydride, due to, for example, a heat treatment for the ink after printed on a recording medium, such as a cloth. Therefore, the film formed on the recording medium has excellent color fastness to water.

As an example of the structure (a1) represented by the general formula (1) above, there can be mentioned the structure of the general formula (1) wherein any one of or both of $R^1$ and $R^2$ represent a hydrogen atom or a cation. When the $R^1$ or $R^2$ is a cation, the oxygen atom in the general formula (1), to which $R^1$ or $R^2$ is bonded, is in the form of O—.

Examples of the cations include a sodium ion, a potassium ion, a lithium ion, a tetramethylammonium ion, a tetraethylammonium ion, a tetrapropylammonium ion, a tetrabutylammonium ion, a tetrapentylammonium ion, a tetrahexylammonium ion, a triethylmethyl ammonium ion, a tributylmethylammonium ion, a trioctylmethylammonium ion, a 2-hydroxyethyltrimethylammonium ion, a tris(2-hydroxyethyl)methylammonium ion, a propyltrimethylammonium ion, a hexyltrimethylammonium ion, an octyltrimethylammonium ion, a nonyltrimethylammonium ion, a decyltrimethylammonium ion, a dodecyltrimethylammonium ion, a tetradecyltrimethylammonium ion, a hexadecyltrimethylammonium ion, an octadecyltrimethylammonium ion, a didodecyldimethylammonium ion, a ditetradecyldimethylammonium ion, a dihexadecyldimethyl ammonium ion, a dioctadecylidimethylammonium ion, an ethylhexadecyldimethylammonium ion, an ammonium ion, a dimethyl ammonium ion, a trimethylammonium ion, a monoethylammonium ion, a diethylammonium ion, a triethylammonium ion, a monoethanolammonium ion, a diethanolammonium ion, a triethanolammonium ion, a methylethanolammonium ion, a methyldiethanolammonium ion, a dimethylethanolammonium, a monopropanolammonium ion, a dipropanolammonium ion, a tripropanolammonium ion, an isopropanolammonium ion, a morpholinium ion, an N-methylmorpholinium ion, an N-methyl-2-pyrrolidinium ion, and a 2-pyrrolidonium ion.

With respect to the cation, an ammonium ion, or an ammonium ion of an organic amine having a boiling point of 100° C. or lower is preferably used because such an ion is unlikely to remain in the film, achieving higher fastness to water.

Examples of ammonium ions of the organic amine having a boiling point of 100° C. or lower include a dimethylammonium ion, a trimethylammonium ion, a monoethylammonium ion, a diethylammonium ion, and a triethylammonium ion.

When the ink having the polymer (A) dissolved or dispersed in the aqueous medium (C) is used, with respect to the polymer (A) used, the structure (a1) represented by the general formula (1) above is present preferably in an amount of 1% by mass or more, more preferably in an amount of 1 to 40% by mass, based on the mass of the polymer (A), because the dispersion stability of the polymer (A) in the ink is excellent so that settling of the polymer (A) can be suppressed during storage of the ink, making it possible to reduce a change of the ink in viscosity or particle diameter.

Further, when the ink of the invention is used as an ink-jet ink, the structure (a1) represented by the general formula (1) above is present preferably in an amount of 40% by mass or less, based on the mass of the polymer (A), from the viewpoint of controlling the viscosity of the ink to be a viscosity suitable for an ink-jet printing method (preferably in the range of 3 to 30 mPa·s, more preferably 5 to 15 mPa·s in an environment at a temperature of 25° C.), and the structure (a1) is present more preferably in an amount of 1 to 20% by mass, based on the mass of the polymer (A).

Further, the polymer (A) having the aromatic cyclic structure (a2) is preferably used. By using the polymer (A) having the aromatic cyclic structure (a2), it is possible to control the proportion of the structure (a1) in the polymer (A) to be in a desired range. In addition, by introducing the aromatic cyclic structure (a2) into the polymer (A), the glass transition temperature of the polymer (A) is advantageously easily controlled to be in an arbitrary range, so that the ink having excellent fixing properties onto a recording medium, such as a cloth, can be obtained.

Examples of the aromatic cyclic structures (a2) include a phenyl group, a benzyl group, a tolyl group, and a naphthalene group. Especially, the aromatic cyclic structure (a2) is preferably a phenyl group.

Further, the polymer (A) having the above-mentioned structure (a1) and optionally another structure can be used, and the polymer (A) having a structure (Y) containing at least one of a glycidyl group and a hydroxyl group is especially preferably used because the ink having the polymer (A) stably dissolved or dispersed in an aqueous medium (C), such as water, can be formed, and further a crosslinking reaction is caused between the structure (a1) and the structure (Y) due to a heat treatment after printed on a recording medium, making it possible to form a film having excellent fastness to water.

Further, the polymer (A) having the structure (a1) and the structure (Y) containing at least one of a glycidyl group and a hydroxyl group is especially preferably used because there can be formed a printed image or the like which is unlikely to suffer from color fading, for example, even when washed by an ultrasonic cleaning method or the like that is used for cleaning a stain strongly deposited on clothes or the like.

When the polymer (A) having the structure (Y) containing at least one of a glycidyl group and a hydroxyl group is heated at about 100° C. or higher, a carboxyl group or a carboxylic anhydride croup, which is derived from the general formula (1) above, the below-mentioned general formula (2), or the chemical formula (3), and the structure (Y) containing at least one of a glycidyl group and a hydroxyl group undergo a reaction, so that the polymer (A) becomes water-insoluble. Therefore, the ink containing the polymer (A) can dramatically improve the printed article in fastness to water.

With respect to the polymer (A), when the polymer (A) having the below-mentioned structure (Z) represented by the general formula (2) is used, the structure (Y) containing a glycidyl group is preferably used in view of obtaining a printed article having more excellent fastness to water.

Further, the polymer (A) having the above-mentioned structure or structures and optionally a structure (Z) represented by the following general formula (2) can be used.

[Chem. 1]

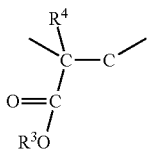

(2)

Wherein, in the general formula (2), $R^5$ represents a hydrogen atom or a cation, and $R^4$ represents a hydrogen atom or an alkyl group.

With respect to $R^3$ in the general formula (2) above, the same as those mentioned above as examples for $R^1$ and $R^2$ in the general formula (1) can be used. Examples of $R^4$ in the general formula (2) above include a hydrogen atom, and alkyl groups, such as a methyl group and an ethyl group, and preferred is a hydrogen atom.

With respect to the polymer (A), the structure (a1) represented by the general formula (1) and the structure (Z) represented by the general formula (2) are preferably used in combination. In this case, there can be obtained the ink having both fastness to water at a level where a printed image or the like will not be removed from a recording medium, such as a cloth, even when, for example, washed with water, warm water, or the like and excellent re-dissolution properties (properties such that, for example, when the ink is discharged from an ink-jet nozzle having the ink component deposited, the ink component is dissolved in the ink before discharged, making it possible to prevent the occurrence of discharge in an inappropriate direction or the like due to the deposited ink component).

Especially when the below-mentioned emulsion polymerization method is employed as a method for producing the polymer (A), the polymer having a combination of the structure (a1) represented by the general formula (1) and the structure (Z) represented by the general formula (2) is preferably used in view of obtaining the ink having both more excellent fastness to water and excellent re-dissolution properties.

With respect to the ink of the invention, in the case where the ink having the polymer (A) dissolved or dispersed in the aqueous medium (C) is used, it is preferred that, when the mass proportion (% by mass) of the structure (a1) in the polymer (A) is taken as $W_{a1}$ and the mass proportion (% by mass) of the structure (Z) in the polymer (A) is taken as $W_z$, $W_{a1}+0.5\times W_z$ in the polymer (A) used is 1% by mass or more because the dispersion stability of the polymer (A) in the aqueous ink is excellent so that settling of the polymer (A) can be suppressed during storage of the ink, making it possible to reduce a change of the ink in viscosity or particle diameter.

Further, when the ink of the invention is used as an ink-jet ink, the upper limit of $W_{a1}+0.5\times W_z$ is preferably 40% by mass or less from the viewpoint of controlling the viscosity of the ink to be a viscosity suitable for an ink-jet printing method (preferably in the range of 3 to 30 mPa·s, more preferably 5 to 15 mPa·s in an environment at a temperature of 25° C.), and the upper limit is more preferably 20% by mass or less.

With respect to the polymer (A), for example, the polymer (A) which is obtained by polymerizing a monomer having a polymerizable unsaturated bond can be used.

With respect to the monomer, for example, for introducing the structure (a1) into the polymer (A), maleic anhydride, maleic acid, fumaric acid, or the like can be used, and maleic anhydride is preferably used in view of achieving more excellent fastness to water.

Further, with respect to the monomer, for example, for introducing the aromatic cyclic structure (a2) into the polymer (A), styrene, α-methylstyrene, vinyltoluene, 4-tert-butylstyrene, chlorostyrene, vinylanisole, vinylnaphthalene, or the like is preferably used.

Further, with respect to the monomer, for introducing the structure represented by the general formula (2) into the polymer (A), acrylic acid or methacrylic acid can be used.

With respect to the monomer, when the structure (Y) having a glycidyl group is used, glycidyl (meth)acrylate, glycidyl allyl ether, or the like can be used, and, of these, glycidyl methacrylate is preferably used.

With respect to the monomer, when the structure (Y) having a hydroxyl group is used, a hydroxyalkyl (meth)acrylate, such as 2-hydroxyethyl acrylate, 2-hydroxypropyl acrylate, 2-hydroxyethyl methacrylate, or 2-hydroxypropyl acrylate, can be used, and, of these, 2-hydroxyethyl methacrylate is preferably used.

With respect to the monomer, in addition to the above-mentioned monomer, if necessary, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, octyl methacrylate, decyl methacrylate, dodecyl methacrylate, octadecyl methacrylate, cyclohexyl methacrylate, phenyl methacrylate, benzyl methacrylate, or the like can be used.

With respect to the monomer usable in the production of the polymer (A), in addition to the above-mentioned monomer, if necessary, a monomer, e.g., a vinyl ester, such as vinyl acetate, a vinylcyan compound, such as acrylonitrile or methacrylonitrile, a halide monomer, such as vinylidene chloride or vinyl chloride, an olefin, such as ethylene or propylene, a diene, such as butadiene or chloroprene, a vinyl monomer, such as vinyl ether, vinyl ketone, or vinylpyrrolidone, an ethylenically unsaturated carboxylic acid having a carboxyl group, such as crotonic acid, or an acrylamide, such as acrylamide, methacrylamide, or N, N'-dimethylacrylamide, can be used.

With respect to the above-mentioned monomer, a monomer having the aromatic cyclic structure (a2) or the alkyl (meth)acrylate is preferably used because the glass transition temperature of the polymer (A) can be easily controlled to be in an arbitrary range, so that the ink having excellent fixing properties onto a recording medium, such as a cloth, can be obtained.

Further, with respect to the monomer, a monomer having two or more polymerizable double bonds can be used.

Examples of the monomers include diacrylates, such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl) propane, and 2,2'-bis(4-acryloxydiethoxyphenyl) propane; triacrylates, such as trimethylolpropane triacrylate, trimethylolethane triacrylate, and tetramethylolmethane triacrylate; tetraacrylates, such as ditrimethylol tetraacrylate, tetramethylolmethane tetraacrylate, and pentaerythritol tetraacrylate; hexaacrylates, such as dipentaerythritol hexaacrylate; dimethacrylates, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl) propane; trimethacrylates, such as trimethylolpropane trimethacrylate and trimethylolethane trimethacrylate; methylenebisacrylamide, and divinylbenzene.

The polymer (A) can be produced by subjecting the monomer capable of introducing the structure (a1) represented by the general formula (1) or the structure represented by the chemical formula (3) into the polymer (A) and optionally a monomer having the structure (Z) represented by the general formula (2), a monomer having a glycidyl group or a hydroxyl group, or the like to radical polymerization in the presence of a polymerization initiator, for example, without using a solvent or in the presence of an organic solvent.

With respect to the above-mentioned organic solvent, for example, aromatic solvents, such as toluene and xylene; alicyclic solvents, such as cyclohexanone; ester solvents, such as butyl acetate and ethyl acetate; cellosolves, such as isobutanol, normalbutanol, isopropyl alcohol, sorbitol, and propylene glycol monomethyl ether acetate; ketones, such as methyl ethyl ketone and methyl isobutyl ketone, and the like can be used individually or in combination.

With respect to the above-mentioned polymerization initiator, for example, azo compounds, such as 2,2'-azobis isobutyronitrile), 2,2'-azobis(2-methylbutyronitrile), and azobiscyanovaleric acid; organic peroxides, such as tert-butyl peroxypivalate, tert-butyl peroxybenzoate, tert-butyl peroxy-2-ethylhexanoate, di-tert-butyl peroxide, cumene hydroperoxide, benzoyl peroxide, and tert-butyl hydroperoxide; inorganic peroxides, such as hydrogen peroxide, ammonium persulfate, potassium persulfate, and sodium persulfate, and the like can be used individually or in combination. The polymerization initiator is preferably used in an amount in the range of 0.1 to 10% by mass, based on the total mass of the monomers used in the production of the polymer (A).

The polymer (A) can also be produced by a phase inversion emulsification method in which, for example, without using a solvent or in the presence of an organic solvent, the monomer capable of introducing the structure (a1) represented by the general formula (1) or the structure represented by the chemical formula (3) into the polymer (A) and optionally a monomer having the structure (Z) represented by the general formula (2), a monomer having a glycidyl group or a hydroxyl group, or the like are subjected to radical polymerization in the presence of a polymerization initiator, and then the structure represented by the chemical formula (3) is caused to undergo ring opening to form a carboxyl group, and part of or all of the carboxyl group is neutralized, followed by mixing with an aqueous medium (C), such as water. The mixture of the polymer (A) and aqueous medium (C) obtained by the above-mentioned method can be preferably used when producing an aqueous ink.

When the mixture of the polymer (A) and aqueous medium (C) is produced, if necessary, an emulsifying agent may be used for further improving the dispersion stability of the polymer (A) in the aqueous medium (C).

Examples of the emulsifying agents include nonionic emulsifying agents, such as polyoxyethylene nonyl phenyl ether, polyoxyethylene lauryl ether, polyoxyethylene styryl phenyl ether, polyoxyethylene sorbitol tetraoleate, and a polyoxyethylene-polyoxypropylene copolymer; anionic emulsifying agents, such as fatty acid salts, e.g., sodium oleate, alkylsulfuric acid ester salts, alkylbenzenesulfonic acid salts, alkylsulfosuccinic acid salts, naphthalenesulfonic acid salts, polyoxyethylene alkylsulfuric acid salts, alkanesulfonate sodium salts, and alkyldiphenyl ether sulfonic acid sodium salts; and cationic emulsifying agents, such as alkylamine salts, alkyltrimethylammonium salts, and alkyldimethylbenzylammonium salts.

Examples of the aqueous media (C) include water, an organic solvent miscible with water, and a mixture thereof.

With respect to the aqueous medium (C), only water may be used, a mixture of water and an organic solvent miscible with water may be used, or only an organic solvent miscible with water may be used, but, from the viewpoint of improving the safety and reducing the load on the environment, only water or a mixture of water and an organic solvent miscible with water is preferably used, and only water is especially preferably used.

With respect to the above-mentioned water, pure water, such as ion-exchanged water, ultrafiltered water, reverse-osmosed water, or distilled water, or ultrapure water can be used. With respect to the water, water irradiated with an ultraviolet light, or water sterilized with hydrogen peroxide or the like is preferably used because it is possible to effectively prevent the generation of fungi or bacteria in the ink of the invention.

The ink containing the polymer (A) produced by the phase inversion emulsification method is likely to have slightly poor storage stability, as compared to the ink containing the polymer (A) obtained by the below-mentioned emulsion polymerization method. For this reason, when the ink having very excellent storage stability is produced using the polymer (A) produced by the phase inversion emulsification method, the polymer (A) having the structure represented by the general formula (2) above or having the structure (Y) containing at least one of a glycidyl group and a hydroxyl group is preferably used in view of obtaining the ink having excellent storage stability as well as excellent fastness to water and the like.

Further, the polymer (A) can be produced by subjecting the above-mentioned monomers to emulsion polymerization in the presence of, for example, an emulsifying agent, a polymerization initiator, and an aqueous medium (C). By employing the emulsion polymerization method, it is easy to control the particle diameter of the polymer (A), and the degree of freedom of the combination of the monomers for maintaining excellent storage stability of the ink is increased, so that the ink having both excellent storage stability and fastness to water and the like can be obtained. Further, the ink containing the polymer (A) obtained by the emulsion polymerization method has excellent discharge properties when, for example, the ink to be discharged by an ink-jet recording method is produced.

Further, when the polymer (A) is produced by the emulsion polymerization method, the polymer having a combination of the structure (a1) represented by the general formula (1) and the structure (Z) represented by the general formula (2) is preferably used as the polymer (A) in view of obtaining the ink having both more excellent fastness to water and excellent re-dissolution properties.

With respect to the polymerization initiator, the same as those mentioned above as examples of the polymerization initiators can be used, but a water-soluble polymerization initiator is preferably used.

With respect to the emulsifying agent, the same as those mentioned above as examples of the nonionic emulsifying agents, anionic emulsifying agents, and cationic emulsifying agents can be used.

In the radical polymerization, if necessary, a chain transfer agent, a neutralizing agent, or the like may be used.

Examples of the chain transfer agents include tert-dodecylmercaptan, n-dodecylmercaptan, n-octylmercaptan, xanthogens, such as dimethylxanthogen disulfide and diisobutylxanthogen disulfide, dipentene, indene, 1,4-cyclohexadiene, dihydrofuran, and xanthene.

With respect to the particle diameter of the polymer (A) contained in the ink having the polymer (A) dispersed in the aqueous medium (C), for example, when the ink is discharged by an ink-jet recording method, from the viewpoint of maintaining excellent discharge properties of the ink, the particle diameter of the polymer (A) is preferably in the range of 10 to 700 nm, more preferably in the range of 50 to 300 rm. The particle diameter means a volume average particle diameter (Mv) of a water dispersion of the polymer (A), which is diluted with pure water so that the resultant diluted solution has a polymer (A) concentration of 0.05% by mass, and indicates an average of volume average particle diameter (My) values calculated from a particle size distribution obtained by conducting the measurement three times using a particle size distribution meter ("Microtrac UPA150", manufactured by Nikkiso Co., Ltd.).

With respect to the polymer (A) obtained by the above-mentioned method, when an aqueous ink is produced as the ink of the invention, the polymer having an acid value in the range of 10 to 300 mg KOH/g is preferably used in view of obtaining the ink having more excellent dispersion stability in water, and the polymer having an acid value in the range of 10 to 150 mg KOH/g is more preferably used. The acid value in the invention means a theoretical value calculated based on the amount of the monomer having a carboxyl group used in producing the polymer (A), and, when a carboxylic anhydride, such as maleic anhydride, is used in producing the polymer (A), the acid value indicates a value determined by a calculation made on the assumption that all of the carboxylic anhydride undergoes ring opening to form a carboxyl group.

With respect to the mixture of the polymer (A) obtained by the phase inversion emulsification method or emulsion polymerization method and the aqueous medium (C), in view of further improving the water dispersion stability of the polymer (A) in the aqueous medium (C), the aqueous medium (C) is preferably contained in an amount in the range of 30 to 90% by mass, more preferably in the range of 40 to 80% by mass, based on the mass of the mixture of the polymer (A) and aqueous medium (C).

The polymer (A) functions as a binder resin which fixes a colorant (B) contained in the ink, such as a pigment, onto a recording medium.

When a cloth is used as the recording medium, the ink containing the polymer (A) in a large amount is preferably used because the resultant printed article can be remarkably improved in color fastness, such as fastness to washing, dry fastness to rubbing, and wet fastness to rubbing. However, a printed article obtained by printing the ink containing the polymer (A) in a large amount on a cloth tends to have a slightly hard feeling of the printed article. Therefore, the polymer (A) is preferably contained in an amount of 1 to 20% by mass, more preferably 2 to 10% by mass, based on the mass of the ink.

With respect to the ink of the invention, the ink containing a colorant (B) can be used. With respect to the colorant (B), for example, a pigment or a dye can be used, and a pigment is preferably used. With respect to the pigment, for example, an inorganic pigment or an organic pigment can be used.

With respect to the inorganic pigment, for example, titanium oxide, iron oxide, carbon black produced by a known method, such as a contact method, a furnace method, or a thermal method, or the like can be used.

With respect to the organic pigment, for example, an azo pigment (including an azo lake, an insoluble azo pigment, a condensed azo pigment, a chelate azo pigment, and the like), polycyclic pigments (e.g., a phthalocyanine pigment, a perylene pigment, a perynone pigment, an anthraquinone pigment, a quinacridone pigment, a dioxazine pigment, a thioindigo pigment, an isoindolinone pigment, and a quinophthalone pigment), dye chelates (e.g., a basic dye chelate and an acid dye chelate), a nitro pigment, a nitroso pigment, aniline black, and the like can be used.

With respect to specific examples of the pigments, as a pigment used in a black ink, there can be used carbon black, for example, No. 2300, No. 2200B, No. 900, No. 980, No. 960, No. 33, No. 40, No. 45, No. 45L, No. 52, HCF88, MCF88, MA7, MA8, MA100, manufactured by Mitsubishi Chemical Corporation, Raven 5750, Raven 5250, Raven 5000, Raven 3500, Raven 1255, Raven 700, manufactured by Columbia Carbon Corporation, Regal 400R, Regal 330R, Regal 660R, Mogul L, Mogul 700, Monarch 800, Monarch 80, Monarch 900, Monarch 1000, Monarch 1100, Monarch 1300, Monarch 1400, manufactured by Cabot Specialty Chemicals Inc., or Color Black FW1, Color Black FW2, Color Black FW2V, Color Black FW18, Color Black FW200, Color Black S150, Color Black 5160, Color Black S170, Printex 35, Printex U, Printex V, Printex 1400U, Special Black 6, Special Black 5, Special Black 4, Special Black 4A, NIPEX 150, NIPEX 160, NIPEX 170, NIPEX 180, manufactured by Deussa AG.

Specific examples of pigments used in a yellow ink include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, 185.

Specific examples of pigments used in a magenta ink include C.I. Pigment Violet 19, C.I. Pigment Red 5, 7, 12, 48 (Ca), 48 (Mn), 57 (Ca), 57:1, 112, 122, 123, 146, 168, 176, 184, 185, 202, 209, and a mixture or solid solution of two or more pigments selected from these pigments.

Specific examples of pigments used in a cyan ink include C.I. Pigment Blue 1, 2, 3, 15, 15:3, 15:4, 15:6, 16, 22, 60, 63, 66.

As specific examples of pigments used in a red ink, one pigment or two or more pigments selected from the group consisting of C.I. Pigment Red 17, 49:2, 112, 149, 150, 177, 178, 179, 188, 254, 255, and 264 are preferably used.

Specific examples of pigments used in an orange ink include C.I. Pigment Orange 1, 2, 5, 7, 13, 14, 15, 16, 24, 34, 36, 38, 40, 43, 63, 64, 71, 73, 81.

Specific examples of pigments used in a green ink include C.I. Pigment Green 7, 10, 36, 58, 59.

Specific examples of pigments used in a violet ink include C.I. Pigment Violet 19, 23, 32, 33, 36, 38, 43, 50.

With respect to the pigment, the above-mentioned pigments can be used individually or in combination.

With respect to the pigment, for example, the pigment which is in the form of a dry powder or a wet cake can be used.

With respect to the pigment, the pigment having a particle diameter of 25 μm or less is preferred, and the pigment having a particle diameter of 1 μm or less is especially preferred. When the particle diameter of the pigment is in the above range, the pigment is unlikely to settle, so that the pigment dispersibility becomes excellent. In the measurement of the particle diameter, a value measured using a transmission electron microscope (TEM) is employed.

With respect to the pigment, any of a so-called self-dispersible pigment having a water dispersibility imparting group, such as a hydroxyl group or a carboxyl group, on the surface of the pigment and a resin dispersing pigment having the surface of the pigment covered with a dispersible resin can be used.

The dispersible resin can be preferably used for stably dispersing the pigment in water. For example, when the resin dispersing pigment is used, the ratio of the dispersible resin and the pigment, in terms of a mass ratio, is preferably in the range of 1:100 to 1:1, more preferably in the range of 1:10 to 1:1.

The dispersible resin and the polymer (A) which is a binder resin are preferably used in amounts such that their mass ratio [dispersible resin/polymer (A)] is in the range of 0.02 to 2, especially preferably in the range of 0.06 to 1, from the viewpoint of obtaining the ink having more excellent fastness to water and having excellent discharge stability of the ink.

With respect to the dispersible resin, there can be used a polyvinyl alcohol, a polyvinyl pyrrolidone, an acrylic resin having an anionic group, such as an acrylic acid-acrylate copolymer, a styrene-acrylic resin having an anionic group, such as a styrene-acrylic acid copolymer, a styrene-methacrylic acid copolymer, a styrene-methacrylic acid-acrylate copolymer, a styrene-α-methylstyrene-acrylic acid copolymer, or a styrene-α-methylstyrene-acrylic acid-acrylate copolymer, a styrene-maleic acid copolymer, a styrene-maleic anhydride copolymer, a vinylnaphthalene-acrylic acid copolymer, an urethane resin having an anionic group, or a salt thereof.

Of these, the dispersible resin having an anionic group, such as a carboxyl group, is preferably used in view of improving the dispersion stability of the pigment in water, and the dispersible resin having an anionic group and an aromatic group, such as styrene, is preferably used.

Examples of the dispersible resins having an anionic group and an aromatic group include a styrene-acrylic acid copolymer, a styrene-methacrylic acid copolymer, a styrene-methacrylic acid-acrylate copolymer, a styrene-α-methyl styrene-acrylic acid copolymer, a styrene-α-methylstyrene-acrylic acid-acrylate copolymer, a styrene-α-methylstyrene-methacrylic acid copolymer, a styrene-maleic acid copolymer, a styrene-maleic anhydride copolymer, and a vinylnaphthalene-acrylic acid copolymer.

With respect to the dispersible resin having an anionic group and an aromatic group, for example, any of a random polymer, a block polymer, and an alternating polymer can be used, but a block polymer is preferably used.

With respect to the dispersible resin having an anionic group and an aromatic group, there can be used the dispersible resin obtained by polymerizing styrene, (meth)acrylic acid, (a) an (meth)acrylate, or the like by a living radical polymerization method, a living cationic polymerization method, a living anionic polymerization method, or the like, and the dispersible resin obtained by a living anionic polymerization method or the like is preferably used.

With respect to the dispersible resin obtained by a living anionic polymerization method or the like, specifically, a resin represented by the general formula (4) or the like can be used.

[Chem. 2]

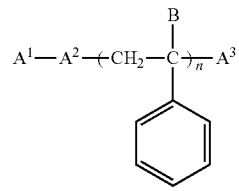

(4)

In the general formula (4), $A^1$ represents an organolithium initiator residue, $A^2$ represents a polymer block of a monomer having an aromatic ring or a heterocycle, $A^3$ represents a polymer block containing an anionic group, n represents an integer of 1 to 5, and B represents an aromatic group or an alkyl group.

In the general formula (4), $A^1$ represents an organolithium initiator residue. Specific examples of organolithium initiators include alkyllithiums, such as methyl lithium, ethyllithium, propyl lithium, butyllithium (such as n-butyllithium, sec-butyllithium, iso-butyllithium, and tert-butyllithium), pentyllithium, hexyllithium, methoxymethyllithium, and ethoxymethyl lithium; phenylalkylenelithiums, such as benzyl lithium, α-methylstyryllithium, 1,1-diphenyl-3-methylpentyllithium, 1,1-diphenylhexyllithium, and phenylethyllithium; alkenyllithiums, such as vinyllithium, allyllithium, propenyllithium, and butenyllithium; alkynyllithiums, such as ethynyllithium, butynyllithium, pentynyllithium, and hexynyllithium; aryllithiums, such as phenyllithium and naphthyllithium; heterocyclic lithiums, such as 2-thienyllithium, 4-pyridyllithium, and 2-quinolyllithium; and alkyllithium-magnesium complexes, such as tri(n-butyl)magnesium-lithium and trimethylmagnesium-lithium.

From the viewpoint of maintaining the stable dispersion state of the pigment, the dispersible resin having a weight average molecular weight of 1,000 to 100,000 is preferably used, and the dispersible resin having a weight average molecular weight of 1,000 to 30,000 is more preferably used.

The ink of the invention can be produced by, for example, mixing together the polymer (A) or a mixture of the polymer (A) and a solvent, the colorant (B), and optionally other additives.

The above-mentioned ink, especially aqueous ink can be produced by, for example, preparing an aqueous pigment dispersion containing a pigment as the colorant (B) at a high concentration, and mixing together the prepared aqueous pigment dispersion, water, a surfactant, the polymer (A), and optionally other additives.

As a method for producing the aqueous pigment dispersion, for example, there can be mentioned the following methods (1) to (3).

(1) A method in which a pigment is added to a mixture containing a dispersible resin and water, and then the pigment is dispersed in the mixture using an agitating or dispersing apparatus to prepare an aqueous pigment dispersion.

(2) A method in which a pigment and a dispersible resin are kneaded using a kneading machine, such as a two-roll mill or a mixer, and water and optionally an organic solvent miscible with water are added to the resultant kneaded mixture using an agitating or dispersing apparatus to prepare an aqueous pigment dispersion.

(3) A method in which a dispersible resin is dissolved in an organic solvent compatible with water, such as methyl ethyl ketone or tetrahydrofuran, and a pigment is added to the resultant solution, and then the pigment is dispersed in the organic solution using an agitating or dispersing apparatus, and then the resultant dispersion is subjected to phase inversion emulsification using an aqueous medium, followed by distilling off the organic solvent, to prepare an aqueous pigment dispersion.

With respect to the kneading machine, there is no particular limitation, and, for example, there can be mentioned a Henschel mixer, a pressure kneader, a Banbury mixer, an intensive mixer, a planetary mixer, and a butterfly mixer.

With respect to the agitating or dispersing apparatus, for example, an ultrasonic homogenizer, a high-pressure homogenizer, a paint shaker, a ball mill, a roll mill, a sand mill, a sand grinder, a Dyno-mill, a Dispermat, an SC mill, a Nanomizer, and the like can be used individually or in combination.

The aqueous pigment dispersion containing a pigment in an amount of 5 to 60% by mass, based on the mass of the aqueous pigment dispersion, is preferably used in view of obtaining the ink which can form a printed article having a high image density and which has excellent dispersion stability, and the aqueous pigment dispersion containing a pigment in an amount of 10 to 50% by mass is more preferably used.

Further, coarse particles contained in the aqueous pigment dispersion cause the image properties to be poor, and therefore it is preferred to use the aqueous pigment dispersion which has coarse particles removed therefrom by a centrifugal separation or filtration treatment or the like before and after producing the ink.

In producing the aqueous pigment dispersion, after the dispersing step, an impurity removal step by an ion exchange treatment or an ultrafiltration treatment may be performed, followed by an after treatment. Ionic substances, such as cations or anions (e.g., bivalent metal ions), can be removed by an ion exchange treatment, and substances having impurities dissolved (such as residual substances in the synthesis of the pigment, excess components of the dispersion composition, a resin which does not adsorb on an organic pigment, and mixed foreign matter) can be removed by an ultrafiltration treatment. In the ion exchange treatment, a known ion-exchange resin is used. In the ultrafiltration treatment, a known ultrafiltration membrane is used, and it may be either of a general type or of a type of twofold increased ability.

The ink of the invention can be produced by mixing together the aqueous pigment dispersion obtained by the above-mentioned method, the polymer (A), an aqueous medium (C), such as water or an organic solvent miscible with water, and optionally an additive.

The ink of the invention preferably has a pigment concentration of 1 to 20% by mass for the necessity of obtaining a satisfactory image density and surely achieving excellent dispersion stability of the pigment in the ink.

With respect to the ink of the invention, the ink containing an additive, such as an antiseptic agent, a viscosity modifier, a pH adjustor, a chelating agent, an antioxidant, an ultraviolet light absorber, a flame retardant, a crosslinking agent, or a surfactant, can be used.

With respect to the above-mentioned humectant, for example, an organic solvent or a saccharide can be used.

With respect to the above-mentioned organic solvent, for example, monohydric or polyhydric alcohols, amides, ketones, ketoalcohols, cyclic ethers, glycols, lower alkyl ethers of a polyhydric alcohol, polyalkylene glycols, polyols, such as glycerol, ethylene glycol, diethylene glycol, triethylene glycol, tetraethylene glycol, propylene glycol, dipropylene glycol, polypropylene glycol, 1,3-propanediol, 1,4-butanediol, 1,5-pentanediol, 1,6-hexanediol, 1,2-hexanediol, 1,2-pentanediol, 4-methyl-1,2-pentanediol, 1,2,6-hexanetriol, trimethylolpropane, and pentaerythritol, polyhydric alcohol alkyl ethers, such as diethylene glycol monobutyl ether, triethylene glycol monobutyl ether, tetraethylene glycol monomethyl ether, propylene glycol monomethyl ether, dipropylene glycol monomethyl ether, tripropylene glycol monomethyl ether, and propylene glycol monobutyl ether, polyhydric alcohol aryl ethers and polyhydric alcohol aralkyl ethers, such as ethylene glycol monophenyl ether and ethylene glycol monobenzyl ether, lactams, such as 2-pyrrolidone, N-methyl-2-pyrrolidone, 1,3-dimethylimidazolidinone, and ε-caprolactam, acetone, ethyl acetate, m-butyrolactone, polyoxyalkylene addition products of glycerol, methyl acetate, tetrahydrofuran, 1,4-dioxane, dioxolane, propylene glycol monomethyl ether acetate, dimethyl sulfoxide, diacetone alcohol, dimethylformamide, propylene glycol monomethyl ether, and the like can be used individually or in combination.

Examples of the saccharides include monosaccharides and polysaccharides, and there can be used glucose, mannose, fructose, ribose, xylose, arabinose, lactose, galactose, aldonic acid, maltose, cellobiose, sucrose, trehalose, maltotriose, or alginic acid or a salt thereof, a cyclodextrin, or a cellulose.

Examples of antiseptic agents include sodium benzoate, sodium pentachlorophenol, sodium 2-pyridinethiol-1-oxide, sodium sorbate, sodium dehydroacetate, and 1,2-dibenzisothiazolin-3-one (Proxel GXL, Proxel XL-2, Proxel LV, Proxel AQ, Proxel BD20, Proxel DL, manufactured by Arch Chemicals, Inc.)

Specific examples of viscosity modifiers include natural or synthetic polymers which are mainly water-soluble, such as carboxymethyl cellulose, sodium polyacrylate, polyvinylpyrrolidone, gum arabic, and starch.

Specific examples of pH adjustors include collidine, imidazole, phosphoric acid, 3-(N-morpholino) propanesulfonic acid, tris(hydroxymethyl)aminomethane, and boric acid.

Examples of chelating agents include ethylenediaminetetraacetic acid, ethylenediaminediacetic acid, nitrilotriacetic acid, 1,3-propanediaminetetraacetic acid, diethylenetriaminepentaacetic acid, N-hydroxyethylethylenediaminetriacetic acid, iminodiacetic acid, uramildiacetic acid, 1,2-diaminocyclohexane-N,N,N',N'-tetraacetic acid, malonic acid, succinic acid, glutaric acid, maleic acid, and salts thereof (including hydrates thereof).

Examples of antioxidants or ultraviolet light absorbers include allophanates, such as allophanate and methyl allophanate; biurets, such as biuret, dimethylbiuret, and tetramethylbiuret; L-ascorbic acid and salts thereof; Tinuvin 328, 900, 1130, 384, 292, 123, 144, 622, 770, 292, Irgacor 252, 153, Irganox 1010, 1076, 1035, MD1024, manufactured by Ciba-Geigy, and oxides of lanthanide.

With respect to the surfactant, an amphoteric surfactant or a nonionic surfactant is preferably used. Examples of the amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives.

With respect to the nonionic surfactant, there can be used an acetylene glycol surfactant, an acetylene alcohol surfactant, an ether surfactant, such as polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, or polyoxyalkylene alkyl ether, an ester surfactant, such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, or polyoxyethylene stearate, a silicone surfactant, such as dimethylpolysiloxane, or a fluorine-containing surfactant, such as a fluoroalkyl ester or a perfluoroalkylcarboxylic acid salt. Of these, with respect to the surfactant, an acetylene glycol surfactant or an acetylene alcohol surfactant is preferably used.

Examples of the acetylene glycol surfactants include SURFYNOL 61, 82, 104, 420, 440, 465, 485, 2502, Dynol 604, 607, manufactured by Air Products Limited, and OLFINE E1004, E1006, E1010, manufactured by Nissin Chemical Industry Co., Ltd.

Examples of the silicone surfactants include SILFACE SAG503A, SAG014, manufactured by Nissin Chemical Industry Co., Ltd., and TEGOWETKL 245, 250, 260, 270, 280, manufactured by Evonik Industries AG.

The ink of the invention can be used as, for example, an ink for ink-jet recording, an ink for screen printing, an ink for dip dyeing, or the like, and is preferably used as an ink for ink-jet recording.

When the ink is used as an ink for ink-jet recording, the ink having a surface tension of 20 to 60 mN/m, as measured at a temperature of 25° C., is preferably used, the ink having a surface tension of 20 to 50 mN/m is more preferably used, and the ink having a surface tension of 25 to 45 mN/m is preferably used from the viewpoint of maintaining excellent discharge stability.

The surface tension of the ink can be appropriately controlled by using the above-mentioned surfactant, and, with respect to the ink for ink-jet recording, the ink containing the surfactant in an amount in the range of 0.1 to 2.5% by mass, based on the mass of the ink, is preferably used, and the ink containing the surfactant in an amount in the range of 0.1 to 1.0% by mass, based on the mass of the ink, is more preferably used because excellent discharge stability of the ink can be maintained even when ink-jet printing is conducted at a high speed or in a continuous manner, so that an increase of printing failure with the passage of time can be suppressed, making it possible to dramatically improve the production efficiency of the printed article.

The ink of the invention can be used in printing on, for example, paper, a cloth, a synthetic leather, a natural leather, or the like. The ink of the invention has excellent color fastness to water, and therefore can be preferably used in printing on a cloth among the above-mentioned recording media.

The cloth usable in the invention is preferably a medium formed from a fiber, and may be woven fabric or nonwoven fabric. With respect to the material for cloth, a cloth formed from an arbitrary natural fiber or synthetic fiber, such as cotton, silk, wool, linen, nylon, polyester, polyurethane, or rayon, or a cloth formed from a mixture of these fibers can be used.

As examples of the printed article obtained by printing the ink of the invention on the above-mentioned recording medium, such as a cloth, there can be mentioned fiber products for household textile, such as clothes, e.g., a T-shirt, a cover, a sheet, and a curtain.

A method for producing the printed article includes, for example, the steps of (1) depositing the ink of the invention on the above-mentioned recording medium, such as a cloth, and (2) heating the ink at a temperature of 100 to 150° C. to transform the structure (a1) represented by the general formula (1) in the polymer (A) contained in the ink to a structure represented by the chemical formula (3).

In the step [1], as a system for depositing the ink of the invention on the recording medium, for example, there can be mentioned an ink-jet recording system.

Further, in the step [1], as a method for depositing the ink of the invention on a recording medium, for example, there can be mentioned a method for printing on a recording medium in a sheet form and a method for printing on a recording medium in a roll form.

Further, it is preferred that the material having the ink deposited thereon obtained in the step [1] is heated in the step [2].

In the heating step in the step [2], the heating temperature and the heating time may be arbitrarily selected, taking the heat resistance of a recording medium, such as a cloth, and the like into consideration, but preferably heating at a temperature of 80 to 200° C. for 1 to 20 minutes, more preferably heating at a temperature of 100 to 150° C. for 1 to 10 minutes, especially preferably heating at a temperature of 120 to 150° C. for 1 to 5 minutes is conducted.

In the step [2], the ink is subjected to the heating step, so that part of or all of the structure of the general formula (1) in the polymer (A) contained in the ink is transformed to a structure of the chemical formula (3) which is a carboxylic anhydride. Thus, the printed article obtained through the step [2] has fastness to washing at a level where a printed image or the like will not be removed from a recording medium, such as a cloth even when, for example, washed with water, warm water, or the like.

EXAMPLES

Hereinbelow, the present invention will be described in detail with reference to the following Examples and Comparative Examples.

<Synthesis of Polymer (A)>

Production Example 1: Synthesis of an Acrylic Copolymer Water Dispersion (A-1)

41.0 Parts by mass of methyl ethyl ketone was charged into a vessel equipped with a reflux condenser, a nitrogen gas introducing pipe, a stirrer, a dropping apparatus, and a thermometer, which vessel had been purged with nitrogen gas, and the temperature was increased to 75° C., and 0.12 part by mass of 2,2'-azobis(2-methylbutyronitrile) was added to the vessel, and then a dissolved mixture of 26.0 parts by mass of styrene, 64.0 parts by mass of n-butyl acrylate, 8.0 parts by mass of maleic anhydride, 24.0 parts by mass of methyl ethyl ketone, and 2.0 parts by mass of 2-hydroxyethyl methacrylate, and 0.36 part by mass of 2,2'-azobis(2-methylbutyronitrile) were individually dropwise added to the vessel over 3 hours to conduct a reaction.

After completion of the addition, stirring was continued for one hour, and then 0.12 part by mass of 2,2'-azobis(2-methylbutyronitrile) was added and the resultant mixture was stirred for 5 hours, and then 0.2 part by mass of 2,2'-azobis(2-methylbutyronitrile) was added and the resultant mixture was stirred for 4.5 hours.

Then, 40 parts by mass of isopropyl alcohol and 20.0 parts by mass of a 12.5% by mass aqueous ammonia solution were added to cause the maleic anhydride-derived structure to undergo ring opening and neutralization, and then 310.0 parts by mass of water was added. Methyl ethyl ketone and isopropyl alcohol were removed from the resultant mixture under a reduced pressure at a temperature of 60 to 70° C., and water was added to the mixture so as to control the concentration, obtaining an acrylic copolymer water dispersion (A-1) having the polymer (A) dispersed in an aqueous medium and having a nonvolatile content of 20.0% by mass.

Production Example 2: Synthesis of an Acrylic Copolymer Water Dispersion (A-2)

An acrylic copolymer water dispersion (A-2) having a nonvolatile content of 20.0% by mass was obtained by substantially the same method as in Production Example 1 except that 31.1 parts by mass of styrene, 58.9 parts by mass of n-butyl acrylate, 8 parts by mass of maleic anhydride, and 2 parts by mass of glycidyl methacrylate were used instead of 26.0 parts by mass of styrene, 64.0 parts by mass of n-butyl acrylate, 8.0 parts by mass of maleic anhydride, and 2.0 parts by mass of 2-hydroxyethyl methacrylate.

Production Example 3: Synthesis of an Acrylic Copolymer Water Dispersion (A-3)

An acrylic copolymer water dispersion (A-3) having a nonvolatile content of 20.0% by mass was obtained by substantially the same method as in Production Example 1 except that 30.0 parts by mass of styrene, 57.9 parts by mass of n-butyl acrylate, 4.1 parts by mass of maleic anhydride, 2.0 parts by mass of glycidyl methacrylate, and 6.0 parts by mass of acrylic acid were used instead of 26.0 parts by mass of styrene, 64.0 parts by mass of n-butyl acrylate, 8.0 parts by mass of maleic anhydride, and 2.0 parts by mass of 2-hydroxyethyl methacrylate.

Production Example 4: Synthesis of an Acrylic Copolymer Water Dispersion (A-4)

An acrylic copolymer water dispersion (A-4) having a nonvolatile content of 20.0% by mass was obtained by substantially the same method as in Production Example 1 except that 26.0 parts by mass of styrene, 65.0 parts by mass of n-butyl acrylate, 8.0 parts by mass of maleic anhydride, and 1.0 part by mass of 2-hydroxyethyl methacrylate were used instead of 26.0 parts by mass of styrene, 64.0 parts by mass of n-butyl acrylate, 8.0 parts by mass of maleic anhydride, and 2.0 parts by mass of 2-hydroxyethyl methacrylate.

Production Example 5: Synthesis of an Acrylic Copolymer Water Dispersion (A-5)

An acrylic copolymer water dispersion (A-5) having a nonvolatile content of 20.0% by mass was obtained by substantially the same method as in Production Example 1 except that 33.0 arts by mass of styrene, 59.0 parts by mass of n-butyl acrylate, and 8.0 parts by mass of maleic anhydride were used instead of 26.0 parts by mass of styrene, 64.0 parts by mass of n-butyl acrylate, 8.0 parts by mass of maleic anhydride, and 2.0 parts by mass of 2-hydroxyethyl methacrylate.

Production Example 6: Synthesis of an Acrylic Copolymer Water Dispersion (A-6)

29.0 Parts by mass of styrene, 59.0 parts by mass of n-butyl acrylate, 4.0 parts by mass of maleic anhydride, 6.0 parts by mass of acrylic acid, 2.0 parts by mass of 2-hydroxyethyl methacrylate, 35.0 parts by mass of ion-exchanged water, and 2.5 parts by mass of an anionic emulsifying agent ("HITENOL LA-12", manufactured by Daiichi Kogyo Seiyaku Co., Ltd.) were mixed together, and then emulsified using a homogenizer ("TK Homogenizing Disper", manufactured by Tokushu Kika Kogyo Co., Ltd.) to prepare 137.5 parts by mass of a monomer emulsion.

To a reaction vessel equipped with a reflux condenser, a nitrogen gas introducing pipe, a stirrer, a dropping apparatus, and a thermometer was added 50 parts by mass of pure water, and the temperature was increased to 80° C., and then 4.1 parts by mass of the preliminarily prepared monomer emulsion and 3.9 parts by mass of a 3% by mass aqueous solution of ammonium persulfate were added, and further, after 5 minutes, 133.4 parts by mass of the monomer emulsion and 2.9 parts by mass of a 3% by mass aqueous solution of ammonium persulfate were dropwise added to the reaction vessel over 2.5 hours. After completion of the addition, 10 parts by mass of a 25% by mass aqueous ammonia solution was added, and then 5.15 parts by mass of a 2.9% by mass aqueous solution of tert-butyl hydroperoxide and 5.1 parts by mass of a 2% by mass aqueous solution of sodium metabisulfite were added and the resultant mixture was stirred for 2 hours. The resultant resin emulsion was cooled to room temperature, and then 10.0 parts by mass of a 25% by mass aqueous ammonia solution was added to the emulsion to cause the maleic anhydride-derived structure to undergo ring opening and neutralization, and the nonvolatile content of the emulsion was adjusted using ion-exchanged water to obtain an acrylic copolymer water dispersion (A-6) having a nonvolatile content of 40.0% by mass, which is an aqueous resin emulsion of the polymer (A).

Production Example 7: Synthesis of an Acrylic Copolymer Water Dispersion (A-7)

An acrylic copolymer water dispersion (A-7) having a nonvolatile content of 40.0% by mass was obtained by substantially the same method as in Production Example 6 except that 32.3 parts by mass of styrene, 62.0 parts by mass of n-butyl acrylate, 3.7 parts by mass of maleic anhydride, and 2.0 parts by mass of 2-hydroxyethyl methacrylate were used instead of 29.0 parts by mass of styrene, 59.0 parts by mass of n-butyl acrylate, 4.0 parts by mass of maleic anhydride, 6.0 parts by mass of acrylic acid, and 2.0 parts by mass of 2-hydroxyethyl methacrylate.

Production Example 8: Synthesis of an Acrylic Copolymer Water Dispersion (A-8)

An acrylic copolymer water dispersion (A-8) having a nonvolatile content of 40.0% by mass was obtained by substantially the same method as in Production Example 6 except that 32.8 parts by mass of styrene, 63.5 parts by mass of n-butyl acrylate, 1.5 parts by mass of maleic anhydride, and 2.2 parts by mass of acrylic acid were used instead of 29.0 parts by mass of styrene, 59.0 parts by mass of n-butyl acrylate, 4.0 parts by mass of maleic anhydride, 6.0 parts by mass of acrylic acid, and 2.0 parts by mass of 2-hydroxyethyl methacrylate.

Production Example 9: Synthesis of an Acrylic Copolymer Water Dispersion (A-9)

An acrylic copolymer water dispersion (A-9) having a nonvolatile content of 40.0% by mass was obtained by substantially the same method as in Production Example 6 except that 31.5 parts by mass of styrene, 63.5 parts by mass of n-butyl acrylate, 2.0 parts by mass of maleic anhydride, and 3.0 parts by mass of acrylic acid were used instead of 29.0 parts by mass of styrene, 59.0 parts by mass of n-butyl acrylate, 4.0 parts by mass of maleic anhydride, 6.0 parts by mass of acrylic acid, and 2.0 parts by mass of 2-hydroxyethyl methacrylate.

Production Example 10: Synthesis of an Acrylic Copolymer Water Dispersion (A-10)

An acrylic copolymer water dispersion (A-10) having a nonvolatile content of 40.0% by mass was obtained by substantially the same method as in Production Example 6 except that 32.3 parts by mass of styrene, 63.0 parts by mass of n-butyl acrylate, 2.2 parts by mass of maleic anhydride, 1.5 parts by mass of acrylic acid, 1.0 part by mass of 2-hydroxyethyl methacrylate, 1.5 parts by mass of an anionic emulsifying agent ("HITENOL LA-12", manufactured by Dai-ichi Kogyo Seiyaku Co., Ltd.), 1.0 part by mass of a nonionic emulsifying agent ("DKS NL-180", manufactured by Dai-ichi Kogyo Seiyaku Co., Ltd.), and 2.5 parts by mass of triethylamine were used instead of 29.0 parts by mass of styrene, 59.0 parts by mass of n-butyl acrylate, 4.0 parts by mass of maleic anhydride, 6.0 parts by mass of acrylic acid, 2.0 parts by mass of 2-hydroxyethyl methacrylate, 2.5 parts by mass of an anionic emulsifying agent ("HITENOL LA-12", manufactured by Dai-ichi Kogyo Seiyaku Co., Ltd.), and 10.0 parts by mass of a 25% by mass aqueous ammonia solution.

Comparative Production Example 1: Synthesis of an Acrylic Copolymer Water Dispersion (A-S1)

An acrylic copolymer water dispersion (A-S1) having a nonvolatile content of 20.0% by mass was obtained by substantially the same method as in Production Example 1 except that 26.0 parts by mass of styrene, 62.0 parts by mass of n-butyl acrylate, and 12.0 parts by mass of acrylic acid were used instead of 26.0 parts by mass of styrene, 64.0 parts by mass of n-butyl acrylate, 8.0 parts by mass of maleic anhydride, and 2.0 parts by mass of 2-hydroxyethyl methacrylate.

Comparative Production Example 2: Synthesis of an Acrylic Copolymer Water Dispersion (A-S2)

An acrylic copolymer water dispersion (A-S2) having a nonvolatile content of 20.0% by mass was obtained by substantially the same method as in Production Example 1 except that 25.0 parts by mass of styrene, 61.0 parts by mass of n-butyl acrylate, 12.0 parts by mass of acrylic acid, and 2.0 parts by mass of glycidyl methacrylate were used instead of 26.0 parts by mass of styrene, 64.0 parts by mass of n-butyl acrylate, 8.0 parts by mass of maleic anhydride, and 2.0 parts by mass of 2-hydroxyethyl methacrylate.

Comparative Production Example 3: Synthesis of an Acrylic Copolymer Water Dispersion (A-S3)

An acrylic copolymer water dispersion (A-S3) having a nonvolatile content of 40.0% by mass was obtained by substantially the same method as in Production Example 6 except that 63.0 parts by mass of n-butyl acrylate, 35.0 parts by mass of styrene, and 2.0 parts by mass of acrylic acid were used instead of 29.0 parts by mass of styrene, 59.0 parts by mass of n-butyl acrylate, 4.0 parts by mass of maleic anhydride, 6.0 parts by mass of acrylic acid, and 2.0 parts by mass of 2-hydroxyethyl methacrylate.

Comparative Production Example 4: Synthesis of an Acrylic Copolymer Water Dispersion (A-S4)

An acrylic copolymer water dispersion (A-S4) having a nonvolatile content of 40.0% by mass was obtained by substantially the same method as in Production Example 6 except that 62.0 parts by mass of n-butyl acrylate, 26.0 parts by mass of styrene, and 12.0 parts by mass of acrylic acid were used instead of 29.0 parts by mass of styrene, 59.0 parts by mass of n-butyl acrylate, 4.0 parts by mass of maleic anhydride, 6.0 parts by mass of acrylic acid, and 2.0 parts by mass of 2-hydroxyethyi methacrylate.

Comparative Production Example 5: Synthesis of an Acrylic Copolymer Water Dispersion (A-S5)

An acrylic copolymer water dispersion (A-S5) having a nonvolatile content of 40.0% by mass was obtained by substantially the same method as in Production Example 6 except that 62.5 parts by mass of n-butyl acrylate, 32.5 parts by mass of styrene, 3.0 parts by mass of acrylic acid, and 2.0 parts by mass of glycidyl methacrylate were used instead of 29.0 parts by mass of styrene, 59.0 parts by mass of n-butyl acrylate, 4.0 parts by mass of maleic anhydride, 6.0 parts by mass of acrylic acid, and 2.0 parts by mass of 2-hydroxyethyl methacrylate.

TABLE 1

|  | A-1 | A-2 | A-3 | A-4 | A-5 |
|---|---|---|---|---|---|
| MAH (Parts by mass) | 8 | 8 | 4.1 | 8 | 8 |
| ST (Parts by mass) | 26 | 31.1 | 30 | 26 | 33 |
| BA (Parts by mass) | 64 | 58.9 | 57.9 | 65 | 59 |
| AA (Parts by mass) |  |  | 6 |  |  |
| GMA (Parts by mass) |  | 2 | 2 |  |  |
| HEMA (Parts by mass) | 2 |  |  | 1 |  |
| Acid value (mg KOH/g) | 92 | 92 | 94 | 92 | 94 |

TABLE 2

|  | A-6 | A-7 | A-8 | A-9 | A-10 |
|---|---|---|---|---|---|
| MAH (Parts by mass) | 4 | 3.7 | 1.5 | 2 | 2.2 |
| ST (Parts by mass) | 29 | 32.3 | 32.8 | 31.5 | 32.3 |
| BA (Parts by mass) | 59 | 62 | 63.5 | 63.5 | 63 |
| AA (Parts by mass) | 6 |  | 2.2 | 3 | 1.5 |
| GMA (Parts by mass) |  |  |  |  |  |
| HEMA (Parts by mass) | 2 | 2 |  |  | 1 |
| Acid value (mg KOH/g) | 93 | 42 | 34 | 46 | 34 |

TABLE 3

|  | A-S1 | A-S2 | A-S3 | A-S4 | A-S5 |
|---|---|---|---|---|---|
| MAH (Parts by mass) |  |  |  |  |  |
| ST (Parts by mass) | 26 | 25 | 35 | 26 | 32.5 |
| BA (Parts by mass) | 62 | 61 | 63 | 62 | 62.5 |
| AA (Parts by mass) | 12 | 12 | 2 | 12 | 3 |
| GMA (Parts by mass) |  | 2 |  |  | 2 |
| HEMA (Parts by mass) |  |  |  |  |  |
| Acid value (mg KOH/g) | 94 | 94 | 16 | 94 | 23 |

The abbreviations shown in Tables 1 to 3 are described below.
MAH: Maleic anhydride
ST: Styrene
BA: n-Butyl acrylate
A: Acrylic acid
GMA: Glycidyl methacrylate
HEMA: 2-Hydroxyethyl methacrylate Synthesis Example of a Dispersible Resin (P-1)

A hexane solution of BuLi and a solution of styrene preliminarily obtained by dissolving styrene in tetrahydrofuran were introduced from tube reactors P1 and P2 into a T-shaped micromixer M1 shown in FIG. 1, and subjected to living anionic polymerization to obtain a polymer.

Then, the polymer obtained in the above step was transferred through a tube reactor R1 to a T-shaped micromixer M2 shown in FIG. 1, and the propagation end of the polymer was trapped by a reaction controlling agent (α-methylstyrene (α-MeSt)) introduced from a tube reactor P3.

Then, a solution of tert-butyl methacrylate preliminarily obtained by dissolving tert-butyl methacrylate in tetrahydrofuran was introduced from a tube reactor P4 into a T-shaped micromixer M3 shown in FIG. 1, and subjected to continuous living anionic polymerization reaction, together with the trapped polymer transferred through a tube reactor R2. Then, the living anionic polymerization reaction was quenched by feeding methanol to obtain a block copolymer (PA-1) composition.

In producing the block copolymer (PA-1) composition, the whole of the microreactor shown in FIG. 1 was completely immersed in a constant temperature bath so that the reaction temperature was set to 24° C.

The molar ratio of the monomers constituting the block copolymer (PA-1) obtained by the above-mentioned method was as follows: (BuLi/styrene/α-methylstyrene/tert-butyl methacrylate)=1.0/12.0/13/8.1.

The obtained block copolymer (PA-1) composition was hydrolyzed by treatment with a cation exchange resin and then evaporated under a reduced pressure, and the resultant solid was pulverized to obtain a dispersible resin (P-1) in a powder form having a weight average molecular weight of 2,710 and having an acid value of 145.

(Method for Measuring an Acid Value)

An acid value of the obtained dispersible resin (P-1) was measured as follows.

The measurement was conducted in accordance with JIS test method K 0070-1992. 0.5 g of a sample was dissolved in a THF solvent, and the resultant solution was subjected to titration with a 0.1 M alcohol solution of potassium hydroxide using phenolphthalein as an indicator to determine an acid value.

<Method for Producing an Aqueous Pigment Dispersion (B-1)>

150 Parts by mass of Fastogen Super Magenta RY (C.I. Pigment Red 122, manufactured by DIC Corporation) as a pigment, 30 parts by mass of the dispersible resin (P-1), 150 parts by mass of triethylene glycol, and 11.5 parts by mass of a 34% by mass aqueous solution of potassium hydroxide were charged into a 1.0 L intensive mixer (manufactured by Nippon Eirich Co., Ltd.), and kneaded at a rotor peripheral speed of 2.94 m/s and at a pan peripheral speed of 1 m/s for 60 minutes.

Then, to the kneaded mixture in the intensive mixer vessel was slowly added 450 parts by mass of ion-exchanged water while stirring, and then 208.5 parts by mass of ion-exchanged water was further added to obtain an aqueous pigment dispersion (B-1) having a pigment concentration of 15.0% by mass.

<Example 1> Preparation of an Aqueous Ink 25.0 Parts by mass of the aqueous pigment dispersion (B-1), 1.0 part by mass of a surfactant (SURFYNOL 440), 30.0 parts by mass of the acrylic copolymer water dispersion (A-1), 25.0 parts by mass of glycerol as a humectant, 5.0 parts by mass of triethylene glycol, and ion-exchanged water in such an amount that the total mass became 100 were mixed together, and the resultant mixture was satisfactorily stirred using a dispersing stirrer (TK Homogenizing Disper L, manufactured by Tokushu Kika Kogyo Co., Ltd.) to obtain an aqueous ink (C1).

<Example 2> Preparation of an Aqueous Ink

An aqueous ink (C2) was obtained by substantially the same method as in Example 1 except that, instead of the acrylic copolymer water dispersion (A-1), the acrylic copolymer water dispersion (A-2) was used.

<Example 3> Preparation of an Aqueous Ink

An aqueous ink (C3) was obtained by substantially the same method as in Example 1 except that, instead of the acrylic copolymer water dispersion (A-1), the acrylic copolymer water dispersion (A-3) was used.

<Example 4> Preparation of an Aqueous Ink

An aqueous ink ((1:4) was obtained by substantially the same method as in Example 1 except that, instead of the acrylic copolymer water dispersion (A-1), the acrylic copolymer water dispersion (A-4) was used.

<Example 5> Preparation of an Aqueous Ink

An aqueous ink (C5) was obtained by substantially the same method as in Example 1 except that, instead of the acrylic copolymer water dispersion (A-1), the acrylic copolymer water dispersion (A-5) was used.

<Example 6> Preparation of an Aqueous Ink

An aqueous ink (C6) was obtained by substantially the same method as in Example 1 except that, instead of the acrylic copolymer water dispersion (A-1), the acrylic copolymer water dispersion (A-6) was used.

\<Example 7\> Preparation of an Aqueous Ink

An aqueous ink (C7) was obtained by substantially the same method as in Example 1 except that, instead of the acrylic copolymer water dispersion (A-1), 15.0 parts by mass of the acrylic copolymer water dispersion (A-7) was used.

\<Example 8\> Preparation of an Aqueous Ink

An aqueous ink (C8) was obtained by substantially the same method as in Example 1 except that, instead of the acrylic copolymer water dispersion (A-1), 15.0 parts by mass of the acrylic copolymer water dispersion (A-8) was used.

\<Example 9\> Preparation of an Aqueous Ink

An aqueous ink (C9) was obtained by substantially the same method as in Example 1 except that, instead of the acrylic copolymer water dispersion (A-1), 15.0 parts by mass of the acrylic copolymer water dispersion (A-9) was used.

\<Example 10\> Preparation of an Aqueous Ink

An aqueous ink (C10) was obtained by substantially the same method as in Example 1 except that, instead of the acrylic copolymer water dispersion (A-1), 15.0 parts by mass of the acrylic copolymer water dispersion (A-10) was used.

\<Comparative Example 1\> Preparation of an Aqueous Ink

An aqueous ink (D1) was obtained by substantially the same method as in Example 1 except that, instead of the acrylic copolymer water dispersion (A-1), the acrylic copolymer water dispersion (A-S1) was used.

\<Comparative Example 2\> Preparation of an Aqueous Ink

An aqueous ink (D2) was obtained by substantially the same method as in Example 1 except that, instead of the acrylic copolymer water dispersion (A-1), the acrylic copolymer water dispersion (A-S2) was used.

\<Comparative Example 3\> Preparation of an Aqueous Ink

An aqueous ink (D3) was obtained by substantially the same method as in Example 1 except that, instead of the acrylic copolymer water dispersion (A-1), 15.0 parts by mass of the acrylic copolymer water dispersion (A-S3) was used.

\<Comparative Example 4\> Preparation of an Aqueous Ink

An aqueous ink (D4) was obtained by substantially the same method as in Example 1 except that, instead of the acrylic copolymer water dispersion (A-1), 15.0 parts by mass of the acrylic copolymer water dispersion (A-S4) was used.

\<Comparative Example 5\> Preparation of an Aqueous Ink

An aqueous ink (D5) was obtained by substantially the same method as in Example 1 except that, instead of the acrylic copolymer water dispersion (A-1), 15.0 parts by mass of the acrylic copolymer water dispersion (A-S5) was used.

\<Evaluation of Storage Stability (Viscosity)\>

With respect to the aqueous ink immediately after being produced by the above-mentioned method, a viscosity was measured using a cone-plate type (E-type) viscometer in an environment at 25° C.

Subsequently, 20 mL of the aqueous ink was sealed in a glass vessel and allowed to stand at 60° C. for one week. Then, a viscosity of the aqueous ink after allowed to stand was measured using a cone-plate type (E-type) viscometer.

A change ratio of the viscosity of the aqueous ink after allowed to stand from the viscosity of the aqueous ink immediately after produced was calculated from the formula below, and evaluated in accordance with the criteria shown below.

Change ratio (%)=[{(Viscosity of the aqueous ink after allowed to stand)−(Viscosity of the aqueous ink immediately after produced)}/(Viscosity of the aqueous ink immediately after produced)]

⊙: Within ±5%
○: ±Less than 10%
Δ: ±10 to less than 20%
x: ±20% or more

\<Preparation of a Cloth for Evaluation\>

0.9 mL of an aqueous ink was placed in a 300 mL plastic cup containing therein a 5 cm×7.5 cm cotton cloth so that the aqueous ink was permitted to uniformly penetrate the cotton cloth. The cotton cloth was taken out from the plastic cup and covered in waste to remove the unnecessary aqueous ink, and then subjected to heat treatment at 150° C. for 5 minutes to prepare a cloth for evaluation.

\<Evaluation of Fastness to Washing (Color Fastness to Water, Gray Scale)\>

With respect to the above-prepared cloth for evaluation, a test for fastness to washing was conducted in accordance with JIS L 0844:2005 A-2 method, and then, in accordance with the criteria for a visual evaluation method using the gray scale for change in color of JIS L 0801:2004, a grade was judged from class 1 through class 5. In the grade, class 1 indicates that color fading is the most marked, and, as the grade is closer to class 5, color fading becomes less marked. A cloth rated "class 4-5 or higher" was judged to have excellent fastness to water.

\<Evaluation of Fastness to Washing (Color Fastness to Water, OD Residual Ratio)\>

With respect to the above-prepare d cloth for evaluation, a test for fastness to washing was conducted in accordance with JIS L 0844:2005 A-2 method, and OD of the resultant tested cloth was evaluated using X-Rite 500 (manufactured by X-Rite Inc.), and an OD residual ratio of the cloth before tested was calculated, and evaluated in accordance with the following criteria.

OD Residual ratio (%)==OD of the cloth after tested/OD of the cloth before tested ○: 95% or more
Δ: 80 to less than 95%
x: Less than 80%

<Evaluation of Resistance to Ultrasonic Cleaning>

The cloth for evaluation prepared by the above-mentioned method was cut into a 2 cm×2 cm size, and the cut cloth was sealed in a 20 mL glass vessel, together with 12 mL of a washing liquid used in JIS L 0844:2005 A-2 method, which was heated to 50° C., and then subjected to ultrasonic cleaning using an ultrasonic cleaner Vs-F100 (manufactured by AS ONE Corporation) for 30 minutes. With respect to the color of the washing liquid and the color of the cloth for evaluation after the cleaning, visual evaluation was made in accordance with the following criteria.

⊙: No coloring of the washing liquid was found.

Δ: Slight coloring of the washing liquid was found, and a very small reduction of the printing density of the cloth for evaluation was able to be found.

x: Clear coloring of the washing liquid was found, and a marked reduction of the printing density of the cloth for evaluation was found.

With respect to the aqueous inks in the Examples and Comparative Examples, the formulations and the results of the evaluations are shown in Tables 4 to 6.

TABLE 4

|  | Example 1 | Example 2 | Example 3 | Example 4 | Example 5 |
|---|---|---|---|---|---|
| Aqueous ink | C1 | C2 | C3 | C4 | C5 |
| Aqueous pigment dispersion (B-1) [% by mass] | 25.0 | 25.0 | 25.0 | 25.0 | 25.0 |
| Acrylic copolymer water dispersion | A-1 | A-2 | A-3 | A-4 | A-5 |
| [% by mass] | 30.0 | 30.0 | 30.0 | 30.0 | 30.0 |
| Glycerol [% by mass] | 25.0 | 25.0 | 25.0 | 25.0 | 25.0 |
| Triethylene glycol [% by mass] | 5.0 | 5.0 | 5.0 | 5.0 | 5.0 |
| SURFYNOL 440 [% by mass] | 1.0 | 1.0 | 1.0 | 1.0 | 1.0 |
| Ion-exchanged water [% by mass] | Balance | Balance | Balance | Balance | Balance |
| Total [% by mass] | 100 | 100 | 100 | 100 | 100 |
| Fastness to washing (Gray scale) | 4-5 | 4-5 | 4-5 | 4-5 | 4-5 |
| Fastness to washing (OD Residual ratio) | ○ | ○ | ○ | ○ | ○ |
| Resistance to ultrasonic cleaning | ○ | ○ | ○ | ○ | Δ |
| Storage stability (Viscosity) | ⊙ | ⊙ | ⊙ | ○ | Δ |

TABLE 5

|  | Example 6 | Example 7 | Example 8 | Example 9 | Example 10 |
|---|---|---|---|---|---|
| Aqueous ink | C6 | C7 | C8 | C9 | C10 |
| Aqueous pigment dispersion (B-1) [% by mass] | 25.0 | 25.0 | 25.0 | 25.0 | 25.0 |
| Acrylic copolymer water dispersion | A-6 | A-7 | A-8 | A-9 | A-10 |
| [% by mass] | 15.0 | 15.0 | 15.0 | 15.0 | 15.0 |
| Glycerol [% by mass] | 25.0 | 25.0 | 25.0 | 25.0 | 25.0 |
| Triethylene glycol [% by mass] | 5.0 | 5.0 | 5.0 | 5.0 | 5.0 |
| SURFYNOL 440 [% by mass] | 1.0 | 1.0 | 1.0 | 1.0 | 1.0 |
| Ion-exchanged water [% by mass] | Balance | Balance | Balance | Balance | Balance |
| Total [% by mass] | 100 | 100 | 100 | 100 | 100 |
| Fastness to washing (Gray scale) | 4-5 | 4-5 | 4-5 | 4-5 | 4-5 |
| Fastness to washing (OD Residual ratio) | ○ | ○ | ○ | ○ | ○ |
| Resistance to ultrasonic cleaning | ○ | ○ | Δ | Δ | ○ |
| Storage stability (Viscosity) | ⊙ | ⊙ | ⊙ | ⊙ | ⊙ |

TABLE 6

|  | Comparative Example 1 | Comparative Example 2 | Comparative Example 3 | Comparative Example 4 | Comparative Example 5 |
|---|---|---|---|---|---|
| Aqueous ink | D1 | D2 | D3 | D4 | D5 |
| Aqueous pigment dispersion (B-1) [% by mass] | 25.0 | 25.0 | 25.0 | 25.0 | 25.0 |
| Acrylic copolymer water dispersion | A-S1 | A-S2 | A-S3 | A-S4 | A-S5 |
| [% by mass] | 30.0 | 30.0 | 15.0 | 15.0 | 15.0 |
| Glycerol [% by mass] | 25.0 | 25.0 | 25.0 | 25.0 | 25.0 |
| Triethylene glycol [% by mass] | 5.0 | 5.0 | 5.0 | 5.0 | 5.0 |
| SURFYNOL 440 [% by mass] | 1.0 | 1.0 | 1.0 | 1.0 | 1.0 |
| Ion-exchanged water [% by mass] | Balance | Balance | Balance | Balance | Balance |
| Total [% by mass] | 100 | 100 | 100 | 100 | 100 |
| Fastness to washing (Gray scale) | 1-2 | 4 | 4 | 4 | 4 |
| Fastness to washing (OD Residual ratio) | x | Δ | Δ | Δ | Δ |
| Resistance to ultrasonic cleaning | x | ○ | Δ | Δ | ○ |
| Storage stability (Viscosity) | ⊙ | ○ | ⊙ | Δ | ⊙ |

As apparent from the results shown in Tables 4 to 6, the ink of the invention has such extremely excellent fastness to washing that the fastness to washing (gray scale) is as high as class 4 to class 5, and has such extremely excellent fastness to water that the resistance to ultrasonic cleaning is excellent, and can further achieve storage stability of the ink.

REFERENCE SIGNS LIST

1: T-Shaped micromixer M1
2: T-Shaped micromixer M2
3: T-Shaped micromixer M3
4: Tube reactor R1
5: Tube reactor R2
6: Tube reactor R3
7: Tube reactor P1 for precooling
8: Tube reactor P2 for precooling
9: Tube reactor P3 for precooling
10: Tube reactor P4 for precooling

The invention claimed is:

1. An aqueous ink comprising a polymer (A) comprising:
a first structure (Y) derived from a first monomer of 2-hydroxyethyl methacrylate;
a second structure (a1) derived from a second monomer of maleic anhydride;
a third structure (a2) derived from a third monomer of styrene; and
a fourth structure derived from a fourth monomer of acrylic acid or methacrylic acid,
wherein the polymer (A) has the structure (a1) in an amount in the range of 1 to 20% by mass, based on the mass of the polymer (A),
wherein the polymer (A) is included in an amount of 6 to 10% by mass based on the mass of the ink,
wherein a change ratio of a viscosity of the ink after storage at 60° C. for one week is within ±10%.

2. The ink according to claim 1, wherein the polymer (A) further has a structure (Z) represented by the following general formula (2):

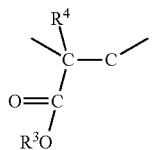

(2)

wherein $R^3$ represents a hydrogen atom or a cation, and $R^4$ represents a hydrogen atom or an alkyl group.

3. The ink according to claim 2, wherein, when the mass proportion (% by mass) of the structure (a1) in the polymer (A) is taken as $W_{a1}$ and the mass proportion (% by mass) of the structure (Z) in the polymer (A) is taken as $W_z$, $W_{a1}$+ 0.5×$W_z$ in the polymer (A) is in the range of 1 to 20% by mass.

4. The ink according to claim 1, further comprising a colorant (B) and an aqueous medium (C).

5. The ink according to claim 1, which is for use in printing on a cloth.

6. A printed article comprising a cloth and a cured product of the ink according to claim 1 deposited on the cloth.

7. A method for producing a printed article, the method comprising the steps of:
(1) depositing the ink according to claim 1 on a cloth; and
(2) heating the ink at a temperature of 100 to 150° C.

8. The method for producing a printed article according to claim 7, wherein the printed article is a fiber product.

9. The method for producing a printed article according to claim 7, wherein the step (1) of depositing the ink is a step of depositing the ink by an ink-jet recording system.

10. The ink according to claim 1, wherein the change ratio of the viscosity is measured by a method comprising:
measuring a first viscosity of the aqueous ink immediately right after manufacturing the aqueous ink;
sealing the aqueous ink in a glass vessel to stand at 60° C. for one week;
measuring a second viscosity of the aqueous ink after the one week; and
calculating the change ratio by the formula below, the change ratio (%)=[{(the second viscosity)−(the first Viscosity)}/(the first viscosity)]×100.

11. The ink according to claim 1, wherein the ink has a resistance to ultrasonic cleaning without finding a coloring of a washing liquid.

12. The ink according to claim 11, wherein the resistance to ultrasonic cleaning is measured by a method comprising:
preparing a cloth for evaluation by placing a cotton cloth into the aqueous ink, followed by taking the cotton cloth from the aqueous ink and subjecting to a heat treatment at 150° C. for 5 minutes;
subjecting the cloth for evaluation to an ultrasonic cleaning for 30 minutes along with a washing liquid in accordance with JIS L 0844:2005 A-2 at 50° C.; and
evaluating if the coloring of the washing liquid is found.

13. The ink according to claim 1, wherein the polymer (A) has the structure (a1) in an amount in the range of 4 to 20% by mass, based on the mass of the polymer (A).

14. The ink according to claim 1, wherein the polymer (A) further comprises a fifth structure derived from a fifth monomer selected from the group consisting of methyl acrylate, ethyl acrylate, isopropyl acrylate, n-butyl acrylate, isobutyl acrylate.

* * * * *